United States Patent [19]
Thayer

[11] 3,807,960
[45] Apr. 30, 1974

[54] APPARATUS FOR ENRICHMENT OF DEUTERIUM BETWEEN WATER AND HYDROGEN SULFIDE BY COUNTERCURRENT MASS TRANSFER

[76] Inventor: Victor R. Thayer, R.D. No. 3, Newark, Del. 19711

[22] Filed: May 19, 1971

[21] Appl. No.: 144,736

Related U.S. Application Data
[62] Division of Ser. No. 847,305, Aug. 4, 1969, Pat. No. 3,692,477.

[52] U.S. Cl.............. 23/270 R, 423/580, 23/310, 23/312 W, 423/563
[51] Int. Cl...... B01d 11/00, C01b 4/00, C01b 5/02
[58] Field of Search...... 23/293, 312 W, 270.5, 310, 23/309, 267 C, 270; 423/580

[56] References Cited
UNITED STATES PATENTS

| | | | |
|---|---|---|---|
| 3,387,944 | 6/1968 | Sherrington | 23/310 |
| 3,395,098 | 7/1968 | Hess | 23/310 |
| 3,028,222 | 4/1962 | Eriksson | 23/312 W |
| 2,741,543 | 4/1956 | Urey | 23/312 W |
| 3,369,874 | 2/1968 | Wilhelm | 23/309 |
| 3,392,539 | 7/1968 | Grimmett | 23/267 C |
| 3,617,209 | 11/1971 | Massonne | 23/310 |
| 3,142,540 | 7/1964 | Spevack | 23/312 W |
| 2,895,803 | 7/1959 | Spevack | 23/312 W |
| 3,437,567 | 4/1969 | Bogart | 23/312 W |

Primary Examiner—Norman Yudkoff
Assistant Examiner—S. J. Emery
Attorney, Agent, or Firm—Mortenson & Weigel

[57] ABSTRACT

A chemical compound, element or isotope of an element is concentrated or enriched by physical or chemical exchange between two fluids passing countercurrently to each other in a plurality of concentrating units (vessels or towers). Each of the units is capable of operating independently. A feed fluid is supplied simultaneously to each of the units which concentrate and enrich it. The degree of enrichment occurring in a particular unit depends upon the physical length of the particular unit. The enriched products produced in the shorter units are fed, in contradistinction to prior art processes, to the longer units for further concentration along with the feed water which is also supplied to the longer unit. A process using the apparatus disclosed may be operated continuously regardless of the shutdown of one or more of the individual units utilized.

4 Claims, 3 Drawing Figures

APPARATUS FOR ENRICHMENT OF DEUTERIUM BETWEEN WATER AND HYDROGEN SULFIDE BY COUNTERCURRENT MASS TRANSFER

BACKGROUND OF THE INVENTION

This is a division of patent application Ser. No. 847,305 filed Aug. 4, 1969, now U.S. Pat. No. 3,692,477 entitled "Process and Apparatus For Enrichment By Countercurrent Mass Transfer".

Chemical or physical exchange between two fluids flowing countercurrently to each other in a conventional exchange tower is commonly used to achieve enrichment or concentration of a desired product. In a typical case, such exchange towers are employed to concentrate or separate isotopes, but problems arise primarily because the separation factors ae small and the desired isotope in many cases is present in relatively low concentrations in the available feed fluid. For these reasons, the enrichment of isotopes is usually accomplished in a series of exchange towers of successively smaller cross-section area rather than in a single unit. In this manner the feed fluid of lower concentration enters the first exchange tower or vessel often called the first stage, and from this a partially concentrated fraction passes on to the second stage. In the second stage part of the desired isotope is extracted and further enriched, the remainder being returned to the first stage. Enrichment of the isotope to the desired level may be achieved in the second stage. Alternatively, the products of the second stage may be passed on to a third and in turn to successive additional stages as may be desired or convenient. Each successive stage achieves a further enrichment and each one beyond the first returns material to the proceeding stage of the series. This arrangement having concentrating units of successively smaller cross-section area in series is typically referred to as a cascade.

One of the reasons for arranging the concentrating units in cascade rather than using a single long exchange unit of constant cross-section area is to reduce the capital cost of the apparatus. Another important reason is to reduce the inventory of the partially concentrated material contained within the apparatus during the operation.

One of the methods utilized in the prior art involving a cascade is described, for example, in U.S. Pat. No. 3,787,526 patented in the name of Jerome S. Spevack on Apr. 2, 1957 and assigned to the U.S. Government and U.S. Pat. No. 2,845,803 issued to Spevack. The method disclosed therein has been used to concentrate deuterium by exchange of hydrogen isotopes between hydrogen sulfide and water to obtain deuterium oxide, otherwise known as heavy water, in concentrated form. The procedure as disclosed and used comprises four basic steps as follows:

1. passing liquid water countercurrently to gaseous hydrogen sulfide in an exchange tower kept at a selected low temperature, wherein deuterium is preferentially transferred from hydrogen sulfide to water;
2. heating water and hydrogen sulfide to a selected higher temperature in apparatus designed for transfer of heat;
3. passing liquid water and gaseous hydrogen sulfide countercurrently in an exchange tower kept at said higher temperature, wherein deuterium is preferentially transferred from water to hydrogen sulfide;
4. cooling both fluids in apparatus designed for transfer of heat, returning hydrogen sulfide to the cold tower then through the hot tower, countercurrently to the water, the water being partially depleted of its deuterium content and being passed to waste.

By proper adjustment of the rates of flow of water and gas, there is caused to occur a transport of deuterium downwardly in the cold tower and upwardly in the hot tower so that deuterium becomes concentrated in both fluids, reaching a maximum in the streams flowing countercurrent between the two towers.

Various cascade arrangements for concentrating deuterium oxide (heavy water) by dual temperature exchange between hydrogen sulfide and water are disclosed in U.S. Pat. Nos. 2,787,526 and 2,895,803, previously cited, and in U.S. Pat. No. 3,411,884 patented in the name of Victor R. Thayer and assigned to the U.S. Government. As noted herein and also as descibed in the said patents, for the purpose of carrying out the cascading and dual temperature exchanges, each exchange unit includes a hot section or zone and a cold section or zone. As described by Spevack in U.S. Pat. No. 2,787,526 each of these sections or zones may be constructed as separate towers, one hot and one cold, or as integral parts of the same tower. When they are integral parts of the same tower, the hydrogen sulfide gas when passing upwardly through the exchange tower must first be heated and humidifed before its passage through the hot zone and then after passage through the hot zone it must be cooled and dehumidified prior to its passage through the cold zone.

Among those cascade-type systems now or formerly in use for the concentration of heavy water are the Dana Plant near Terre Haute, Ind. and the Savannah River plant near Aiken, S.C. Both of these arrangements are described by W. P. Bebbington and V. R. Thayer in an article entitled "Production of Heavy Water" published in *Chemical Engineering Process* Vol. 55, No. 9, September, 1959. A more detailed description of these plants may be found in the U.S.A.E.C. Research and Development Report D.P. — 400 (1959) compiled by J. F. Proctor and edited by Bebbington and Thayer. An improved cascade exchange tower arrangement is described in U.S. Pat. No. 3,411,884.

Regardless of the particular cascade arrangement, whether we are discussing those in use, or those which have been patented or described in the literature, all have certain inherent disadvantages. When any one stage of a cascade system of exchange units is shut down, operation of the entire system is interrupted. Even in those cascades of more advanced design, wherein the first stage, which is always the largest, consists of several exchange towers in parallel, each of which can be shut down independently, nevertheless the subsequent stages, being single towers, disrupt the entire system if shut down. Another disadvantage of the cascade arrangement relates to the capital cost factor. If, for example, capital cost is minimized, the operating flexibility is sacrificed. This is true because in order to minimize capitol cost, a series-parallel type arrangement such as that used at the Dana plant is used. On the other hand, operating flexibility is achieved using several independent series type cascades as at the Savannah River plant. Further, any cascade arrangement involves some penalty in capital cost, operating cost, or both since special facilities are needed for heating and cooling all stages beyond the first. Even in those systems wherein no heat is added to the latter stage but is obtained "free" by cascading gas that has been heated in the first stage, as described, for example, in U.S. Pat. No. 3,411,884, facilities must be provided to transport the gas to and from the later stages in the cascade and to recover heat from the gas passing between the respective hot and cold zones of these later stages.

It is, therefore, an object of this invention to obviate many of the disadvantages of the prior art methods of concentrating compounds, elements or isotopes using cascade methods.

Another object of this invention is to concentrate materials using countercurrent exchange methods which are less expensive, have lower operating inventory and are less subject to loss of production due to shut-down either inadvertent or planned.

BRIEF DESCRIPTION OF THE INVENTION

The apparatus of this invention permits concentrating a desired product such as a chemical compound, element or isotope of the element by exchanging the desired product between fluids, which are physically separable from each other. The apparatus includes in its broadest context first and second exchange units, the second being longer than the first. The fluids are simultaneously passed countercurrently through the lengths of each of the units thereby to enrich the desired product in each unit to a degree proportional to the length of the respective unit. Next a portion of the enriched feed fluid is withdrawn from the point of highest concentration reached in the first unit. This withdrawn, enriched fluid is then passed to selected points in the second unit in order to transfer the desired product for further enrichment, the enriched final product fluid being then withdrawn from the second unit.

In a specific preferred apparatus constructed in accordance with this invention, the hydrogen isotope deuterium is concentrated using apparatus which utilizes the principle of exchange at varying temperatures, carried out in a number of exchange towers of varying lengths. Each of the towers receives the same feed material, in this case, natural water. The desired product, in this case, heavy water (deuterium oxide) is enriched to the selected final concentration by the longest exchange tower and to intermediate concentrations by the other towers. The partially enriched material produced by the shorter towers is further concentrated by the longer units so that all of the product extracted from the feed water in all towers is eventually passed to the longest tower where it is enriched to the selected final concentration.

The invention thus represents a departure from the cascade principle. Instead of employing concentrating stages in series in a cascade, the present invention employs a number of independent units each operated as a first stage. This permits each of the units to be started and/or shut down independently. When in operation, each unit contributes its proportional share to the total production and production continues at a proportionate rate regardless of which unit is shut down. A further advantage of the invention is that the progressive transfer of product from the shorter units to the longer units achieves economy of capital cost and operating inventory more effectively than does any arrangement of units of successively smaller cross-section area operated in cascade.

BRIEF DESCRIPTION OF THE DRAWINGS

The novel features that are considered characteristic of this invention are set forth with particularity in the appended claims. The invention, itself, however both as to its apparatus and method, as well as additional objects and advantages thereof, will best be understood from the following description when read in connection with the accompanying drawings, in which:

DESCRIPTION OF THE PREFERRED EMBODIMENT

Figure 1:
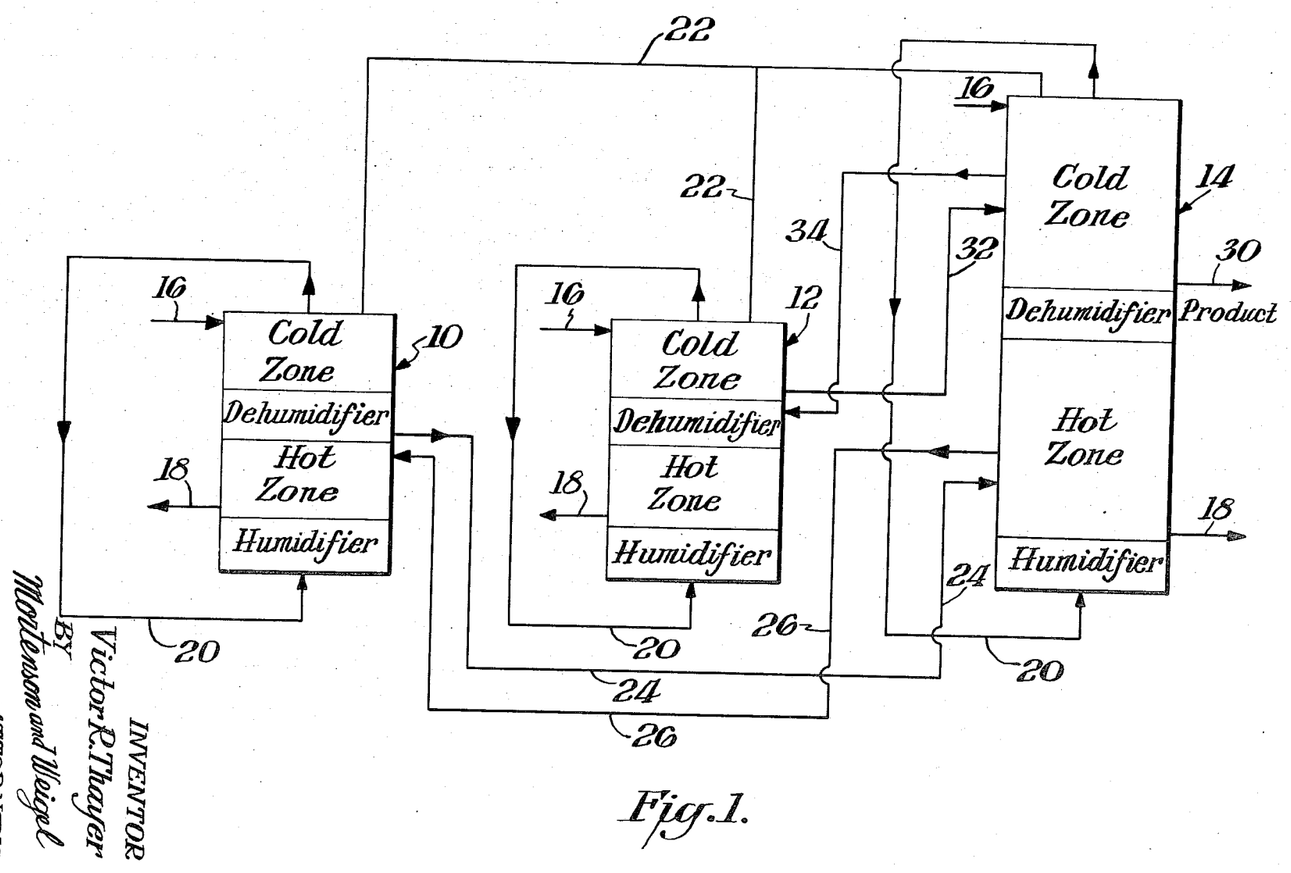
FIG. 1 is a simplified block flow diagram of one of the methods of product enrichment utilized in one embodiment of this invention.

The invention will be described relative to the conventional countercurrent flow process used in concentrating deuterium oxide from a feed of natural water. The block schematic flow diagram of FIG. 1 illustrates one of the methods of this invention utilizing temperature exchange towers which are of conventional design. These towers are all of the same basic design except that the first two towers 10 and 12 are shorter and of the same length whereas the final tower 14 is longer. All of the towers have the same diameter and the longer third tower 14 is approximately twice the height of the first two towers which as noted are the same height. Each tower includes a cold zone so labelled at the top portion, then a dehumidifier zone immediately below the cold zone followed by a hot zone and finally a humidifier zone at the bottom. The cold and hot zones are of conventional design. The dehumidifier and humidifier zones together with their external heat exchangers which are not shown for simplicity of illustration and description are essentially of the type proposed by Proctor and Thayer in their 1962 *Chemical Engineering Process* article. In this article Proctor and Thayer describe the humidifier zone as functioning to exchange a portion of the heat contained in the gas stream leaving the top of the hot tower or zone with a recirculating water stream that in turn heats a second circulating water stream which in turn is used to heat and humidify the gas entering the base of the hot tower. Stream is added to the hot tower after stripping the dissolved hydrogen sulfide gas from the waste. The dehumidifying loop which is at the base of the cold zone cools and dehumidifies the gas prior to passage to the cold zone. Although typically, the cold zone and dehumidifier appear in one tower and the hot zone and its associated humidifier are in a separate tower, it is preferred for reduction of cost and also simplicity of description to consider that the zones and their associated humidification and dehumidification equipment are all part of the same tower 10.

Utilizing these exchange towers 10, 12 and 14, natural water from a suitable source is fed through each tower through a pipe or ingress conduit 16 driven by a suitable pump (not shown) and permitted to flow downwardly through the respective columns 10, 12 and 14 and exit at the bottom portion of the columns through an exit or egress conduit 18 located in the respective hot zones of the column immediately above the humidifier zone. The water from the conduits 18 having some of its original content of heavy water extracted is then discharged to waste. That is, of approximately 150 parts per million of heavy water present in the natural water, about 30 are extracted by the process and 120 parts leave with the effluent or waste water. Of course, the effluent water is stripped of dissolved hydrogen sulfide using conventional stripping apparatus associated with the humidifier zones (this apparatus is not shown for simplicity), the recovered hydrogen sulfide being returned to the process. Hydrogen sulfide is circulated through each tower by suitable centrifugal blowers (not shown). These circulation paths for the hydrogen sulfide in each case are denoted by the lines 20. In each instance the hydrogen sulfide is introduced into the bottom portion of the column and allowed to pass upwardly through the tower to the respective humidifer zones, hot zones, dehumidifier zones and cold zones. It exits from the top of the column and then is recirculated in the manner illustrated by the lines 20. No hydrogen sulfide gas passes between the towers except that represented by the difference between the amount of hydrogen sulfide carried foward in solution from tower to tower and that carried back by the returning solution from tower to tower. Normally, these quantities are almost equal, but if there is any imbalance, it is readily corrected by a small flow through equalizing lines 22, which is connected to the tops of the several towers 10, 12 and 14, to equalize the gas pressures therein. The liquid flow between the towers is discussed in the following paragraphs.

Additional conduits 24 and 26 are connected between the first shorter tower 10 and the lower portion of the longer tower 14. Liquid enriched in deuterium oxide is withdrawn through the conduit 24 from the dehumidifier zone of the first exchange tower 10 and passed into the longer tower 14 at a point near the middle of the hot zone. At the same time liquid is withdrawn using line 26 from the hot zone of the tower 14 at a point just above that at which the feed from the first tower 10 is introduced and returned to the first tower 10 through the conduit 26. This return fluid is introduced into the first tower 10 at a point near the top of the hot zone. Suitable pumps may be used in the conduits 24 and 26 to facilitate this transfer. The interchange of liquids between towers achieves a net transfer of deuterium oxide from the first or shorter tower 10 to the hot zone of the longer third tower 14.

In like manner, the liquid that is withdrawn through the conduit 32 from the bottom of the cold zone of the second shorter tower 12 is introduced into the longer tower 14 at a point near the middle of the cold zone. At the same time liquid is withdrawn from the cold zone of the longer tower 14 from a point just above that at which the feed from the second short tower 12 is introduced, and returned to the top of the dehumidifier of that tower. This last described interchange of liquid between the second shorter tower 12 and the longer tower 14 achieves a net transfer of deuterium oxide from the second tower 12 to the cold zone of the longer tower 14. Water enriched in deuterium oxide is withdrawn from the longer tower 14 through an outlet conduit 30, which may be either connected to the bottom of the cold zone of the tower 14 as illustrated or to the dehumidifier of that tower depending upon whether the fluid being drawn off is desired to be at a low temperature which exists at the bottom of the cold zone or at a higher temperature which exists as the bottom portion of the dehumidifier.

This cross flow or exchange of liquids between the towers herein described in accordance with this invention is an effective way to being additional deuterium oxide to the long tower 14 which deuterium oxide has been extracted from natural water in the shorter towers 10 and 12. In this manner the deuterium oxide extracted from natural water in tower 14 can be combined with that brought in from towers 10 and 12, the whole being then further concentrated in this longer tower 14. This arrangement takes advantage of the fact that the capacity of a given tower to enrich is proportional to the concentration of the material, in this instance deuterium oxide, that is being enriched. For this reason an efficient use of the longer tower 14 is achieved by bringing in deuterium from the shorter towers 10 and 12 thereby providing additional feed for the longer hot and cold zones of the tower 14.

As was previously described, when each of the three towers illustrated in the embodiment of FIG. 1 is operating natural water is fed to each. In accordance with this invention, however, the arrangement is completely flexible. Any one of the towers 10, 12, and/or 14 can be shut down and the remaining towers will continue in operation producing deuterium oxide although not in as great a quantity as before. This permits any one of the towers to be taken out of service while the other continues to operate. Thus, either of the shorter towers 10 and 12 may be taken out of service and the longer tower 14 continues to produce its usual concentration of water enriched with deuterium oxide but in reduced quantity corresponding to its own extraction from natural water plus that extracted by whichever one of the shorter towers 10 or 12 remains in operation. For that matter, even if both of the shorter towers 10 and 12 are shut down, the longer tower 14 continues to produce at a rate corresponding to its own extraction from natural water. On the other hand, if the longer tower 14 is shut down, towers 10 and 12 can be operated in series to produce a lesser quantity of material of the same enrichment as that normally produced by tower 14. In this event, liquid leaving the first shorter tower 10 from the dehumidifier through the conduit 24 is fed to the shorter tower 12 through the natural water inlet conduit 16 instead of the natural water, and water exiting from tower 10 via conduit 18 is sent to the top of the hot zone of tower 10. The enriched product is then withdrawn from the bottom of the cold zone or the upper portion of the humidifier zone as is desired.

It will thus be apparent that the arrangement of this invention reduces the loss of production caused by either the inadvertent failure of the equipment, or to the planned shut down of the particular piece of equipment for maintenance. An additional advantage of the invention is that this flexibility of operation is achieved without an increase in capital cost and, in fact, the invention provides a savings in capital cost compared to that of any arrangements based on the cascade principle. Arrangements based on the cascade principle necessarily require heat exchangers and other auxiliaries for use in connection with the second and subsequent stages which add to their capital cost. By the present invention the operating inventory is reduced by moving the partially concentrated product from the shorter columns to the longer column so that the final enrichment occurs in a single column. This invention provides still another economic advantage in as much as a plant utilizing the method of this invention can be designed to consist of a number of towers of essentially the same size which in turn are served by blowers, pumps and other auxiliaries of essentially the same size.

Figure 2:
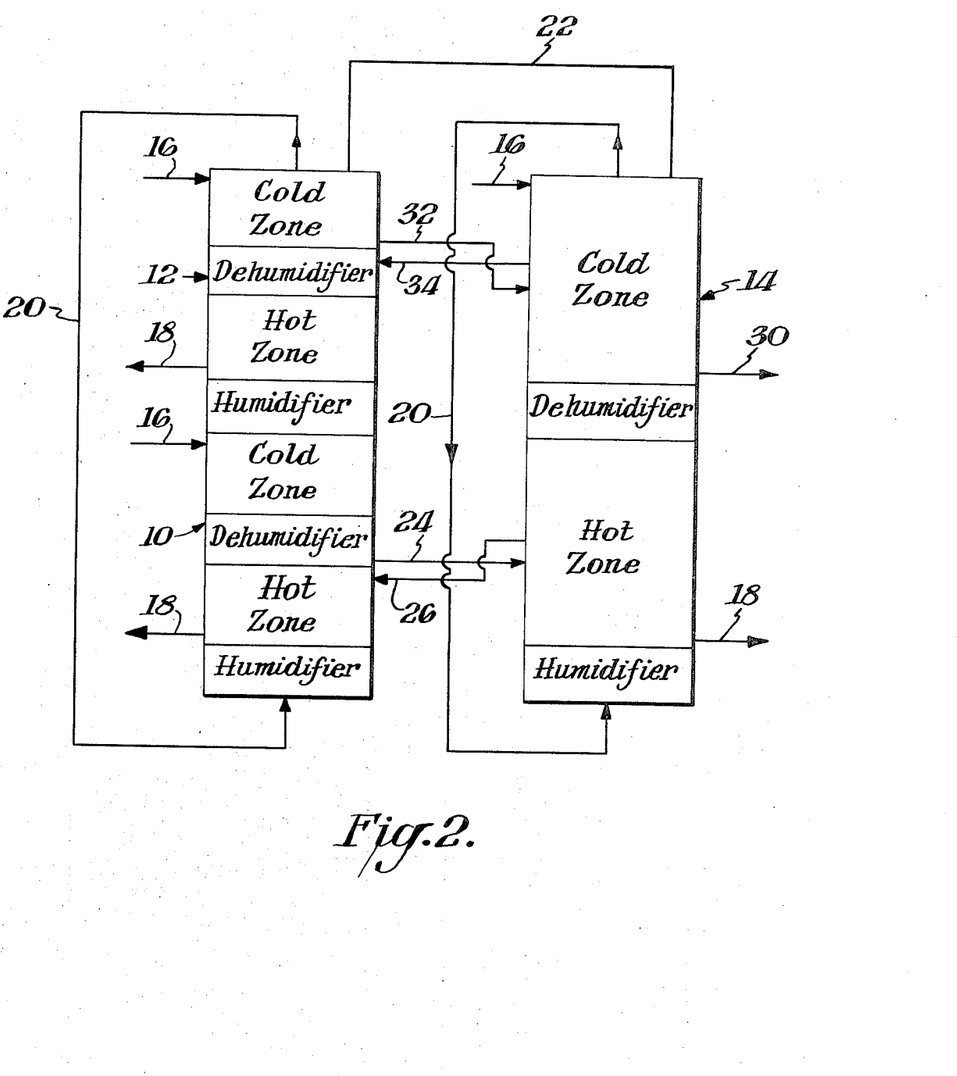
FIG. 2 is a block flow diagram of an alternative method to that illustrated in FIG. 1.

An alternative embodiment of this invention is illustrated in FIG. 2. In this illustration the second short tower 12 is placed directly above the first short tower 10 and, in fact, the two units are for purposes of saving capital cost made structurally one tower having about the same length as the longer tower 14. Other than this the various arrangements and the structure of the various towers is substantially the same as that illustrated in the embodiment of FIG. 1 with the exception that the hydrogen sulfide recirculating loop for the serially connected short towers 10 and 12 is from the top of the upper tower 12 down to the bottom of the lower tower 10. In this manner, there is a serial flow of the hydrogen sulfide gas through the two serially connected towers with the gas passing upwardly through the lower tower 10 thence through the tower 12. The remainder of the parts, as noted, are the same. Hence, for the normal operation of the embodiment of FIG. 2 the liquid flows are substantially the same as those described in conjunction with FIG. 1. Accordingly, the same reference numerals have been used throughout. Since the description of the normal operation is substantially the same as that described in conjunction with FIG. 1 it need not be repeated. On the other hand, the operation of the FIG. 2 embodiment during the partial shut down of one or more of the units is quite different because towers 10 and 12 are now effectively one tower so that in the event of shut down both sections are out of service. This partial reduction infflexibility, with saving in capital cost compared to the arrangement shown in FIG. 1 is a matter of the designer'choice.

The versatility of the arrangement of FIG. 1 may be more apparent from a consideration of the following. When, for example, the combined towers 10 and 12 are shut down, the longer tower 14 continues to produce the enriched materials of the usual concentration but at a lower rate corresponding to its own extraction of heavy water from the natural water. On the other hand when the longer tower 14 is shut down, the feed of natural water to the lower tower 10 is stopped and water passing downwardly through the upper tower 12 is permitted to pass into and down through the lower tower 10. This leaves the bottom of the hot zone of the lower tower 10 through the conduit 18 for stripping and discharge to waste. By a switch of the flows in the heat recovery circuits which are not shown, the dehumidifier of both towers 10 and 12 are deactivated and the humidifier of the upper tower 12 by reversing therethrough becomes a dehumidifier. With this arrangement all of the upper tower 12 then becomes a cold zone having a dehumidifier at the bottom portion thereof and all of the lower tower 10 becomes a hot zone with its existing humidifier at the lower portion thereof. Thus, together the two towers constitute a concentrating unit having the same enriching capacity as the tower 14. Thus, when the longer tower 14 is shut down, the remaining towers 10 and 12 are operated in series as just described and produce material of the same concentration as that normally produced by the longer tower 14.

The degree of enrichment obtained in the apparatus just described depends, of course, upon the type and height of the packing or the type and number of trays in the respective towers and the rate of withdrawal of product. The preferred enrichment for the arrangements illustrated in FIGS. 1 and 2 is a factor of 18. That is, natural water is fed to each of the towers 10, 12 and 14, respectively, and water containing deuterium oxide in a concentration 18 times that of natural water is withdrawn as product through the conduit 30 from the tower 14.

Figure 3:
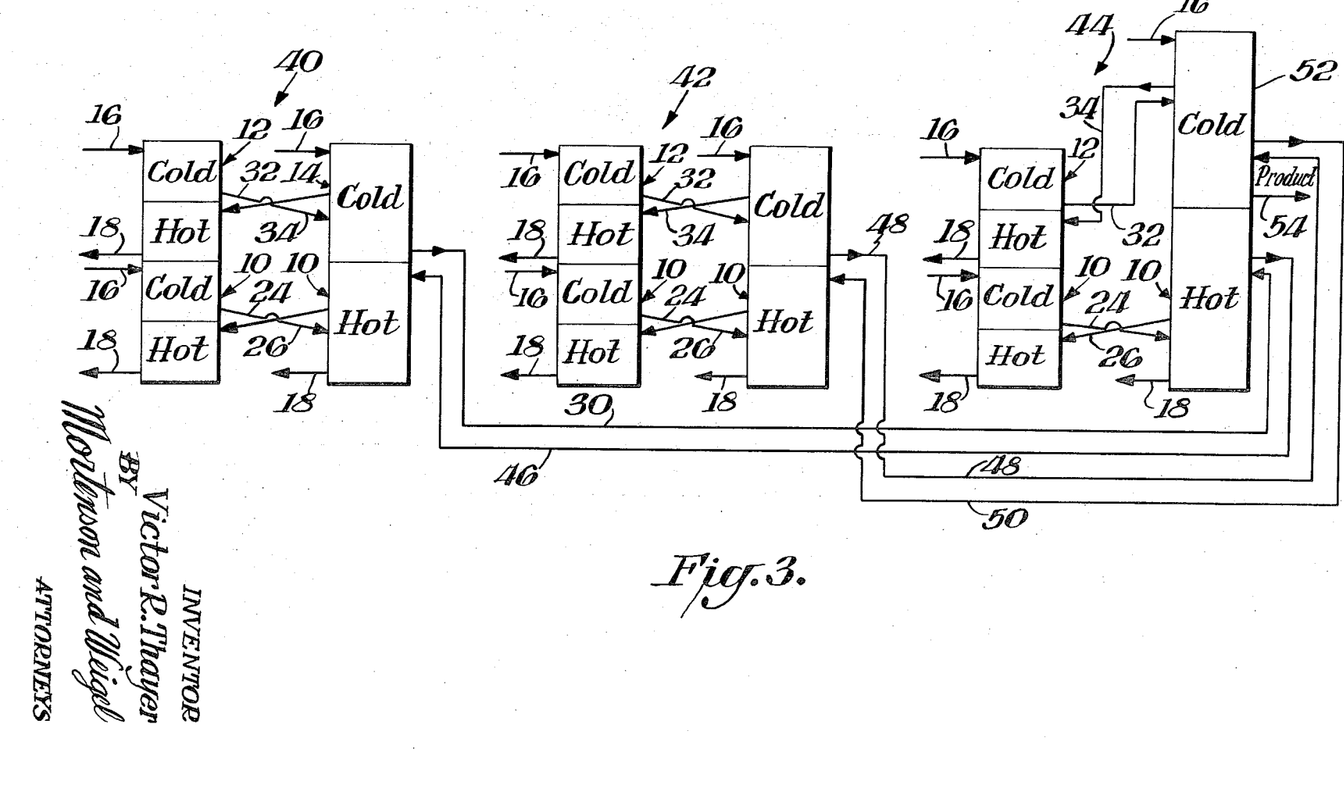
FIG. 3 is a block flow diagram of still another alternative method of this invention.

The illustration of FIG. 3 shows still another embodiment of this invention utilizing groups or clusters of the tower pairs connected as illustrated in the embodiment of FIG. 2. This affords a very versatile method of obtaining high concentrations of the enriched deuterium oxide. The tower pairs are given the designation 40, 42 and 44, respectively, with the first two tower pairs 40 and 42 being substantially identical to the tower pair illustrated in FIG. 2 and accordingly, have been given the same reference numerals. The third tower pair 44 is similar to the other two except that its tower 52 is somewhat longer than the respective towers 14 of the tower pairs 40 and 42. The longest tower 52 serves as will be apparent from the description to bring all of the deuterium extracted by all units in the group to the selected final concentration. In practice, for convenience and structural economy this longest tower 52 is preferably constructed as two towers. However, in order to simplify the description the tower 52 has been shown in FIG. 3 as a single structure. As a further convenience of illustration, the hydrogen sulfide flow paths have been eliminated since in each case they are substantially the same as illustrated in FIG. 2. Furthermore, the dehumidifier and humidifier sections of each of the towers have also been omitted. Aside from this, the operation of each tower pair is substantially the same as previously described.

Thus, the longest tower 52 receives supplemental feed not only from the two short towers 10 and 12 of the tower pair 44 but, in addition, receives as supplementary feed the enriched material produced by the long tower 14 of each of the first two tower pairs 40 and 42, respectively. More specifically, enriched liquid leaves the long tower 14 of the first tower pair 40 through the outlet conduit 30 and enters the upper part of the hot zone of the longest tower 52. A return flow for this system is taken from a hot zone of the longest tower 52 at a point just above the point of entry of the conduit 30 and carries liquid back to the first tower pair 40. This interchange of liquid achieves a net transport of deuterium oxide from the first tower pair 40 to the hot zone of the longest tower 52.

Similarly, enriched liquid leaves the long tower 14 of the second tower pair 42 through the conduit 48 and is introduced to the lower part of the cold zone of the longest tower 52. A return flow for this system is taken from the cold zone of the longest tower 52 at a point just above the point of entry of the conduit 48 and carries liquid back to the second tower pair 42 through the conduit 50. This return liquid is introduced into the long tower 14 of the second tower pair 42 at a point near the top of the dehumidifier (which is not shown for convenience but reference may be had to the illustration of FIG. 2). This interchange of liquid achieves a net transport of deuterium oxide from the second tower pair 42 to the cold zone of the longest tower 52.

Preferably, the tower 52 is designed to enrich the deuterium content of natural water by a factor of one hundred while at the same time enriching the various supplementary feed to the same final concentration. Thus, all deuterium extracted from natural water by all of the tower pairs 40, 42, 44 of FIG. 3 is finally enriched to the selected final concentration, in this instance, one hundred times that of natural water. The final enriched product is withdrawn through the conduit 54 which is located at the bottom of the cold zone of the longest tower 52 just above the dehumidifier. Alternatively, of course, if hot effluent is desired, the effluent may be extracted from the dehumidifier portion itself. The manipulation and shut down of the various individual towers described in conjunction with FIG. 2 is also possible in the arrangement of FIG. 3 but even to a greater degree. Thus, the arrangement may be operated so that if the longest tower 52 is shut down, the towers 10 and 12 of the third tower pair 44 can be operated as one concentrating unit as previously described in discussing FIG. 2, and then may be fed with the partially enriched material derived from the outlet conduits 30 and 48, respectively, of the tower pairs 40 and 42 rather than with natural water. In this case the combined towers 10 and 12 of the third tower pair 44 produce material so the enrichment normally produced by the longest tower 52. By this and similar rerouting of liquid flows, the entire group of towers can be manipulated to maintain production when one or more individual towers are shut down. A specific of all the combinations and permutations is not believed necessary at this point.

It will thus be apparent that whereas the prior art employs the cascade principle for the purpose of successively smaller size in series, the desired product being extracted from feed stock in a large first stage, and further enriched in a series of successively smaller stages, the present invention employs a single unit to extract product from feed stock and enrich it to the desired final concentration. This same single unit at the same time enriches to the final concentration material extracted and partially enriched by other units. Thus, this method saves capital cost because each concentrating unit is in effect a first stage. For this reason, the auxiliary heat recovery facilities required for a staged cascade are eliminated. Furthermore, since all of the towers in the design are essentially the same size, the capital cost is appreciably reduced. Furthermore, the invention permits a high degree of flexibility of operation since any one and in many cases, several towers of the group can be shut down without a total loss of production. This sort of operating flexibility is extremely difficult if not impossible with towers arranged in cascade.

As used in the claims herein the phrases "flow system" and "vessel" denote an apparatus of approximately constant or uniform cross-section area wherein two phases flow countercurrent to each other from end to end of the apparatus. Depending upon the particular application, the apparatus may consist of a single vessel, or alternatively, of two or more vessels arranged serially so that they function as a single vessel, the choice being simply a matter of structural economy and/or convenience.

While this invention has been described in conjunction with the process for enriching deuterium oxide found in natural water by dual temperature exchange, it is to be understood that the invention is equally applicable to concentrating any other compound, element or isotope of an element using any exchange process. The principles of this invention are equally applicable to such other enrichment processes which are well known in the chemical art, whenever low separation factors, entailing large and costly exchange equipment are encountered. For instance, the invention has application to:

1. Rectification (that is, distillation with countercurrent passage of vapor and liquid through exchange columns) such as:
    a. Distillation of water to obtain a fraction enriched in deuterium.
    b. Distillation of water to obtain a fraction enriched in the oxygen isotope, oxygen-18.
    c. Distillation of other hydrogen compounds such as ammonia and methane to obtain fractions enriched in deuterium.
    d. Separation of isomeric chemical compounds (hydrocarbons, alcohols, etc.) that boil at nearly the same temperature, as, for example, normal octane boiling at about 125° C. from 3-methyl heptane boiling at about 122° C.
2. Any chemical exchange process whether carried out at one temperature or at different temperatures, for separation or enrichment of isotopes, such as:
    a. Exchange between liquid ammonia and hydrogen gas, for enrichment of deuterium.
    b. Exchange between water and ethyl mercaptan (both liquids) for enrichment of deuterium.

It will be obvious that various modifications may be made in the apparatus and in the manner of operating it. It is intended to cover such modifications and changes as would occur to those skilled in the art, as far as the following claims permit and as far as consistent with the state of the prior art.

I claim:

1. A system for concentrating deuterium by isotope exchange between two fluids, water and hydrogen sulfide, said system comprising:

first, second and third individual exchange vessels each having an upper cold zone and a lower hot zone, said second vessel being longer and having a substantially greater number of plates than said first exchange vessel, each of said vessels adapted to receive and emit said fluids in countercurrent flow with respect to each other, thereby to enrich deuterium in said second vessel to a higher concentration than in said first vessel, separate first conduit means associated with each of said vessels for recirculating hydrogen sulfide from the top of each said vessel back to the bottom of the same said vessel, outlet means in the lower portion of each of said vessels for water, second conduit means for passing water from the same feed source into the upper end of each of said vessels, third conduit means for passing water from said first vessel enriched to a first concentration of deuterium to the hot zone of said second vessel for further enrichment, fourth conduit means for passing water from a point in the hot zone of said second vessel where water is enriched to a second concentration of deuterium less than said first concentration to said first vessel, fifth conduit means for passing water from said third vessel enriched to a first concentration greater than that of said feed source to the cold zone of said second vessel for further enrichment, and sixth conduit means for passing water from the cold zone in said second vessel where the water is enriched to the second concentration less than said first concentration to said third vessel.

2. A system according to claim 1 wherein said second vessel is longer and has a substantially greater number of plates than said third exchange vessel.

3. A system according to claim 1 wherein said third conduit means is connected to transfer said water from said first vessel to the cold zone of said second vessel.

4. A system according to claim 3 wherein said fourth conduit means is connected to transfer said water from the cold zone of said second vessel to said first vessel, thereby to achieve a net transfer of deuterium oxide to said second vessel.

* * * * *

UNITED STATES PATENT OFFICE
CERTIFICATE OF CORRECTION

Patent No. 3,807,960　　　　　　　　Dated April 30, 1974

Inventor(s) Victor R. Thayer

It is certified that error appears in the above-identified patent and that said Letters Patent are hereby corrected as shown below:

Column 1, line 16 - "ae" should be---are---.
Column 1, line 47 - "3,787,526" should be---2,787,526---.
Column 2, line 38 - "Process" should be---Progress---.
Column 4, line 41 - "Process" should be---Progress---.
Column 4, line 48 - "Stream" should be---Steam---.
Column 5, line 22 - "foward" should be---forward---.
Column 6, line 5 - "being" should be---bring---.
Column 7, line 36 - "designer'" should be---designer's---.

Signed and sealed this 27th day of May 1975.

(SEAL)
Attest:

RUTH C. MASON
Attesting Officer

C. MARSHALL DANN
Commissioner of Patents
　and Trademarks